United States Patent

Nedreski

[15] 3,704,556

[45] Dec. 5, 1972

[54] SPEED ADJUSTING SYSTEM FOR GRINDING WHEEL DRIVES AND THE LIKE

[72] Inventor: Robert Joseph Nedreski, Erie, Pa.

[73] Assignee: General Electric Company

[22] Filed: Dec. 22, 1971

[21] Appl. No.: 210,771

[52] U.S. Cl. .............................. 51/134.5 R, 318/332
[51] Int. Cl. ............................................... B24b 5/00
[58] Field of Search ........... 318/301, 332; 51/134.5 R

[56] References Cited

UNITED STATES PATENTS

| | | | |
|---|---|---|---|
| 3,113,405 | 12/1963 | Schneider | 51/134.5 R |
| 3,178,861 | 4/1965 | Milias | 51/134.5 R |
| 3,560,826 | 2/1971 | Lonaberger | 51/134.5 R |
| 3,570,189 | 3/1971 | Keding | 51/134.5 R |

*Primary Examiner*—Bernard A. Gilheany
*Assistant Examiner*—Thomas Langer
*Attorney*—James C. Davis, Jr. et al.

[57] ABSTRACT

Apparatus and method for adjusting the operating speed of a driven member of variable diameter, such as a grinding wheel, to provide a predetermined peripheral speed. The incremental current required to accelerate the member at a predetermined rate is sensed and utilized to establish a program speed, and the established program speed is thereafter utilized along with actual speed to maintain operation at the program speed.

12 Claims, 3 Drawing Figures

INVENTOR
ROBERT J. NEDRESKI
BY George R. Powers
HIS ATTORNEY

SPEED ADJUSTING SYSTEM FOR GRINDING WHEEL DRIVES AND THE LIKE

BACKGROUND OF THE INVENTION

1. Field of the Invention

This invention relates to speed adjustment in drive systems for grinding wheels and other similar driven members subject to variations in diameter and, more particularly, to the periodic utilization of a measurement of the incremental current required to accelerate the cylindrical member at a predetermined rate to establish a program speed providing a desired peripheral speed.

2. Description of the Invention

It is desirable that grinding wheels and similar members subject to abrasion and the like during operation be utilized to the maximum possible extent. Accordingly, it is desirable that a grinding wheel be used until it has worn down to a diameter much smaller than its initial diameter. Since, however, a grinding wheel is basically a cutting tool, it is desirable for efficient operation that its peripheral speed be maintained within an appropriate and rather limited range. If both of these requirements are to be satisfied, the speed of the drive system (rotational speed of the grinding wheel) must be varied in accordance with variations in the wheel diameter. Specifically, for efficient operation, the rotational speed of the grinding wheel should vary as an inverse function of the wheel diameter, the rotational speed increasing as the wheel wears down. In the past, various methods have been used for periodically adjusting the basic operating speed (program speed) of the drive system as a function of wheel diameter. Most of these prior-art methods have involved a direct measurement of the driven member. For the most part, these approaches have been approximate at best and time consuming and complex in operation.

SUMMARY OF THE INVENTION

It is therefore an object of this invention to provide simplified means for adjusting the basic operating or program speed of a drive system for grinding wheels and the like so as to provide a desired peripheral speed.

Another object of this invention is to provide in a drive system for grinding wheels and the like means for indirectly sensing the diameter of the driven member and adjusting the program speed of the drive system to provide a predetermined peripheral speed at the sensed diameter.

Yet another object is to provide means for periodically adjusting the program speed of a drive system for grinding wheels and the like such that an essentially constant peripheral speed can be maintained throughout a wide range of wheel diameters, the program speed adjustment being accomplished without direct measurement of the wheel diameter.

A still further object of the invention is to provide the foregoing objects in a speed adjusting control system that operates in a substantially automatic manner.

Briefly stated, in carrying out the invention in one form, a drive system for cylindrical members such as grinding wheels includes a variable speed motor, regulating means for controlling the speed of the motor in accordance with a fixed command signal and a net feedback signal, and means for adjusting the program speed such that the net feedback signal is equal to the command signal at an actual speed providing a desired peripheral speed. More particularly, means are provided for producing a signal proportional to the incremental current required to accelerate the driven member at a predetermined rate and for producing in response to the incremental current signal a first output proportional to the program speed required to provide the desired peripheral speed. Means are also provided for producing a second output proportional to the actual speed, and the first and second outputs are utilized to produce a net feedback signal equal to the command signal when the first and second outputs are substantially equal. The first output has a magnitude proportional to $I/(A + BI)$ where I is the magnitude of the incremental current and A and B are constants of proportionality. By a further aspect of the invention, switching means is provided, the switching means being effective during acceleration to couple the incremental current signal generation means and the means for producing the first output and thereafter being effective to uncouple the incremental current signal generation means.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
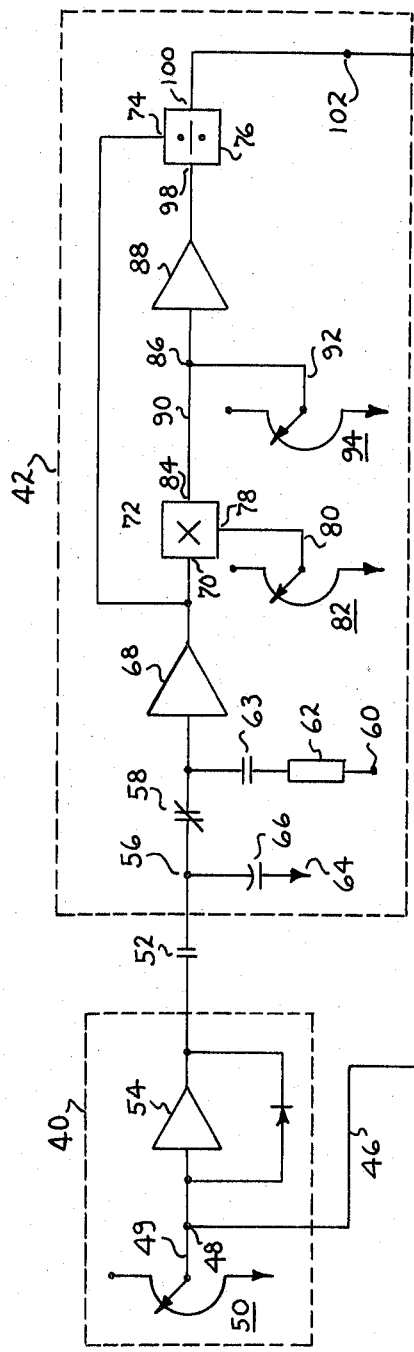
FIG. 1 is a schematic view of grinding wheel drive system including a solid state embodiment of this invention.
Figure 1:
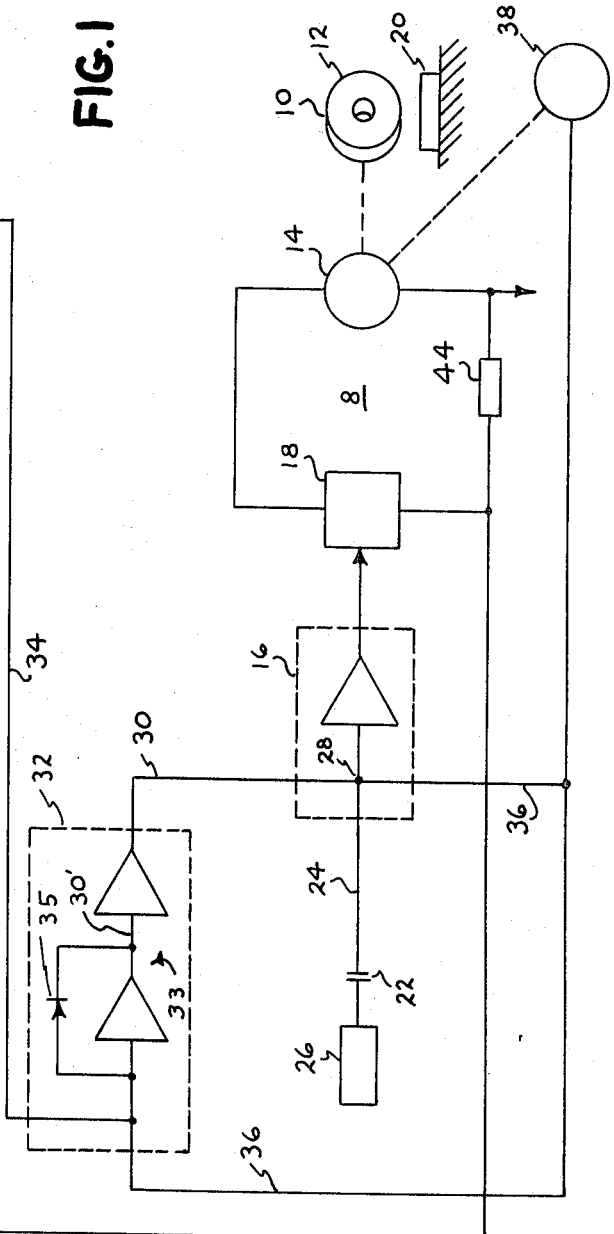

Referring first to FIG. 1, a drive system 8 for rotatably driving a grinding wheel 10 about an axis 12 is illustrated. The drive system 8 includes a variable speed drive motor 14 mechanically connected to the wheel 10 for driving the wheel 10 at a basic operating or program speed established by a regulator 16, the regulator 16 controlling the electric power supplied to the motor 14 by a power unit 18. The power unit 18 may conveniently be a source of d-c electric power, such as power rectifying equipment or a d-c generator, for supplying a d-c motor or a source of a-c electric power, such as an inverter, for supplying an a-c motor. In either case, the regulator 16 controls the output of the motor 14 such that the wheel 10 is driven at a program speed which will, for a particular diameter of the wheel 10, provide a desired peripheral speed of the wheel 10 during grinding contact between the wheel 10 and a workpiece 20.

During grinding operation, contacts 22 are closed (shown open) and a command signal 24 from a command source 26 is supplied to the summing input 28 of the regulator 16, the command signal 24 initially increasing as a fixed ramp function to a final fixed constant level. In accordance with the invention, the command signal 24 has the fixed constant level when the drive system 8 is operating at all normal speeds. The summing junction 28 is also supplied with a signal 36 directly proportional to the actual speed of the motor 14 and the grinding wheel 10. At the maximum permissible speed, the levels of signals 24 and 36 are substantially equal and of opposite polarity. A signal 30 from a feedback generator 32 is also supplied to the input junction 28, the generator 32 being supplied during grinding operation with a constant level signal 34 proportional to a program speed and the actual speed signal 36. The generator 32 includes a high gain amplifying network 33 adapted to produce a signal 30' only when the actual speed as represented by the signal 36 is only slightly greater than the program speed as represented by the signal 34. Furthermore, the signal 30' produced when the signals 34 and 36 are substantially equal in magnitude (signal 36 being only slightly greater in magnitude) is related to the level of the signals 34 and 36 such that signals 30 (inverted signal 30') and 36 provide a net feedback signal essentially equal in magnitude to the command signal 24, but of opposite polarity. Thus, it will be appreciated by those skilled in the art that the actual speed of the wheel 10 is maintained during operation at the level established by the program speed signal 34.

In typical arrangement as illustrated by FIG. 1, the command signal 24 has a positive polarity, the actual speed signal 36 has a negative polarity, and the program speed signal has a positive polarity. The clamping diode 35 of the high gain amplifying network 33 assures that there will be no output signal 30 until the negative signal 36 exceeds the positive signal 34 by a small amount. At such time, a substantial positive signal 30' is produced, which is inverted to provide a negative signal 30 having a magnitude sufficient when combined with the negative signal 36 to balance the positive signal 30. The polarities assumed herein are, of course, merely illustrative; other consistent polarities may be utilized subject to any necessary circuit changes, such as the polarity of the diode 35.

At this point, it will be seen that the operating speed of the grinding wheel 10 can be selectively adjusted by varying the magnitude of the program speed signal 34. Through appropriate adjustment of the signal 34, a desired peripheral wheel speed can be provided throughout a broad range of wheel diameters. It will also occur to those skilled in the art that the signal 34 could be produced through any number of mechanical and electrical arrangements. For example, the diameter of the wheel 10 could be periodically measured by mechanical means, and a program signal level signal could then be calculated and produced through mechanical adjustment of a potentiometer. In accordance with the present invention, however, the program speed signal 36 is produced without direct measurement of the wheel diameter, and the signal is produced in an essentially automatic manner.

The present invention makes use of the fact that the inertia of a cylindrical body is substantially equal to 0.0982 PLD$^4$ where P is the density of the body in lbs/ft$^3$, L is the length of the body in feed, and D is the diameter in feet. In the case of a grinding wheel in which grinding occurs only on its periphery, the diameter is the only variable in the foregoing relationship. Accordingly, in such a case, the inertia is proportional to the fourth power of the diameter, or KD$^4$. In other words, inertial will decrease substantially as the wheel wears down during use. Furthermore, it is known that the increment of load current required to accelerate a cylindrical body at a given rate is substantially given by:

$$I = [ (KD^4) (\Delta RPM)^2 / 308 (5250) (HP) (t) ]$$

where $I$ is the incremental current in amperes, $KD^4$ is the inertia in lb.ft$^2$, $K$ is equal to 0.0982 PL, $\Delta RPM$ is the speed change in rpms, HP is the drive horsepower, and $t$ is the time in seconds during which acceleration occurs. By accelerating a grinding wheel or similar body of known composition and length at a fixed and known rate, the above relationship can be used to establish the actual wheel diameter. Furthermore, it has been found in accordance with this invention that the rotational speed for providing a desired peripheral wheel speed is related to the incremental current in accordance with:

$$S = I/(A + BI)$$

where $S$ is the rotational speed in rpm, $I$ is the incremental current in amperes, and $A$ and $B$ are constants of proportionality selected to provide the desired peripheral speed throughout the entire range of diameters. It will thus be appreciated that the desired peripheral wheel speed can be attained throughout a broad range of wheel diameters through variation of the signal 34 in accordance with the equation $S = I/(A + BI)$ with the signal 34 being directly proportional to $S$. Apparatus for producing such a signal will now be described.

Referring now to FIG. 1, there is provided in accordance with this invention an incremental current signal generator 40 and a program speed signal generator 42. The actual load current flowing between the power unit 18 and the motor 14 is continually sensed in the illustrated embodiment by monitoring the voltage drop across a resistance 44 of known value and transmitting a positive signal 46 proportional to the actual current to a summing junction 48 of the incremental current signal generator 40. From a preset potentiometer 50, the summing junction 48 is supplied with a fixed negative signal 49 proportional to the current required to supply no load losses in the drive system when accelerating at a fixed rate. Junction 48 is thus continually supplied with a net positive signal proportional to the actual load current less the current required to supply no load losses at the given rate of acceleration. More importantly, the junction 48 is supplied with a net signal proportional to the incremental current required to accelerate the wheel 10 at a given rate when the wheel is out of contact with the workpiece 20 and is actually being accelerated at the given rate. An amplifier 54 inverts the signal at junction 48 and supplies the resulting negative signal to a pair of normally open contacts 52 between the generator 40 and the program speed signal generator 42. The various signals are described herein as having specific polarities; it will be obvious to those skilled in the art that other polarities may be utilized so long as the basic relationships are maintained.

The program speed signal generator 42 has an input junction 56 which is coupled to common 64 through a capacitor 66, and to an inverting amplifier 68 through a pair of normally closed contacts 58. The input of the inverting amplifier 68 is also coupled to a source 60 of fixed negative potential through a resistor 62 and a pair of normally open contacts 63. The output of the amplifier 68 is coupled to a multiplication input 70 of a solid state multiplier 72 and to the dividend input 74 of a solid state divider 76. The elements 72 and 76 are structurally identical, the arithmetic function of each element being determined by the manner in which it is wired into the circuit. Solid state multiplying and dividing elements of the type illustrated are well known to those skilled in the art and are commercially available. For example, elements of the type illustrated may be obtained from Motorola Semiconductor Products, Inc. A second multiplication input 78 of element 72 is supplied with a fixed positive signal 80 from a preset potentiometer 82. The product output 84 is coupled to an input junction 86 of a summing amplifier 88 to supply thereto a product signal 90. The junction 86 is also supplied with a fixed positive signal 92 from a preset potentiometer 94. The summed output of the summing amplifier 88 is supplied as a signal 96 to the divisor input 98 of element 76, and the quotient output 100 of the element supplies signal 34 to the output junction 102 of the program speed signal generator 42 and to the feedback signal generator.

As pointed out above, the incremental current signal generator 40 produces under certain conditions of acceleration a signal proportional to the incremental current required to accelerate the wheel 10 at a predetermined rate. The signal produced by the generator 40 will therefore have a maximum level when the wheel 10 has its initial maximum diameter, and the signal will be smaller at lesser wheel diameters. The voltage of source 60 and the value of the resistance 62 are selected such that a signal having a level equal to that of the maximum incremental current signal will be supplied to the amplifier 68 whenever contacts 63 are closed and contacts 58 are simultaneously open. Potentiometer 82 is preset for a given drive system to supply a signal 80 proportional to the constant B in the aforesaid equation $S = I/(A + BI)$ to the input 78 of element 72, and potentiometer 94 is similarly adjusted to supply a signal 92 proportional to the constant A to the junction 86 of the summing amplifier 88. The capacitor 66 is selected to maintain its charge throughout a reasonable operating period following the initial generation of a program speed signal 34.

The operation of the present invention will now be described. With the motor 14 and the wheel 10 initially operating at a previously established program speed and the wheel 10 out of contact with the workpiece 20, the contacts 22 are opened to remove the command signal 24 from the regulator 16. After a suitable low speed is attained, the contacts 22 are closed to reapply the command signal to accelerate the wheel 10, and contacts 63 are closed and contacts 58 are opened to supply a signal proportional to the maximum incremental current signal to inputs 70 and 98 of elements 72 and 76, respectively. If the signal is referred to as $I_{MAX}$, it will be appreciated that output signal 90 of element 72 represents $BI_{MAX}$, that the signal 96 of summing amplifier 88 represents $A + BI_{MAX}$, and that the signal 34 supplied to the feedback signal generator 32 represents $I_{MAX}/(A + BI_{MAX})$. It will therefore be appreciated that the wheel 10 will be accelerated at a known rate established by the ramp of the command signal 24.

As just described, the wheel 10 will be accelerated at the known rate established by the ramp of command signal 24, and the signal generator 40 will therefore produce during the acceleration period a signal proportional to the incremental current utilized to accelerate the wheel. During acceleration, the contacts 52 are closed so that the incremental current signal can charge the capacitor 66 to a level proportional to the incremental current required for acceleration. At the maximum wheel diameter, the charge on the capacitor 66 will be at the same level as that of the fixed level signal provided during acceleration by the source 60 and the resistor 62; at lesser diameters, the charge on the capacitor 66 will be less. Following the charging of the capacitor, but before the wheel 10 reaches its full diameter program speed, the contacts 52 and 63 are opened and the contacts 58 are closed to provide to the amplifier 68 a new signal proportional to the actual incremental current required to accelerate the wheel 10 at the then existing wheel diameter. This signal is then operated on in the solid state network comprising elements 72 and 76 and summing amplifier 88 to produce a new program speed signal 34. In response to the new program speed signal, the regulator 16 will operate the wheel 10 at the new program speed until the subsequent generation of another program speed signal. By automatically operating the apparatus of this invention in the manner described whenever the wheel 10 is removed from the workpiece or at reasonable intervals, the desired peripheral speed can be substantially maintained throughout a broad range of wheel diameters. As just described, there will be an abrupt change in the signal 34 when the contacts 52 and 63 are opened and the contacts 58 are closed. It may be desirable in practice to provide appropriate means for gradually changing the magnitude of the signal 34 so as to prevent an excessively abrupt change in the actual wheel speed.

In the foregoing description, it has been pointed out that various contacts must be sequentially opened and closed. The manner in which this is accomplished has not been described since it is believed that the design of apparatus suitable for accomplishing this purpose would be obvious to those skilled in the art. In any event, a contactor arrangement for the embodiment of FIG. 2 will presently be described; this arrangement could be readily modified for use in the embodiment of FIG. 1.

Figure 2:
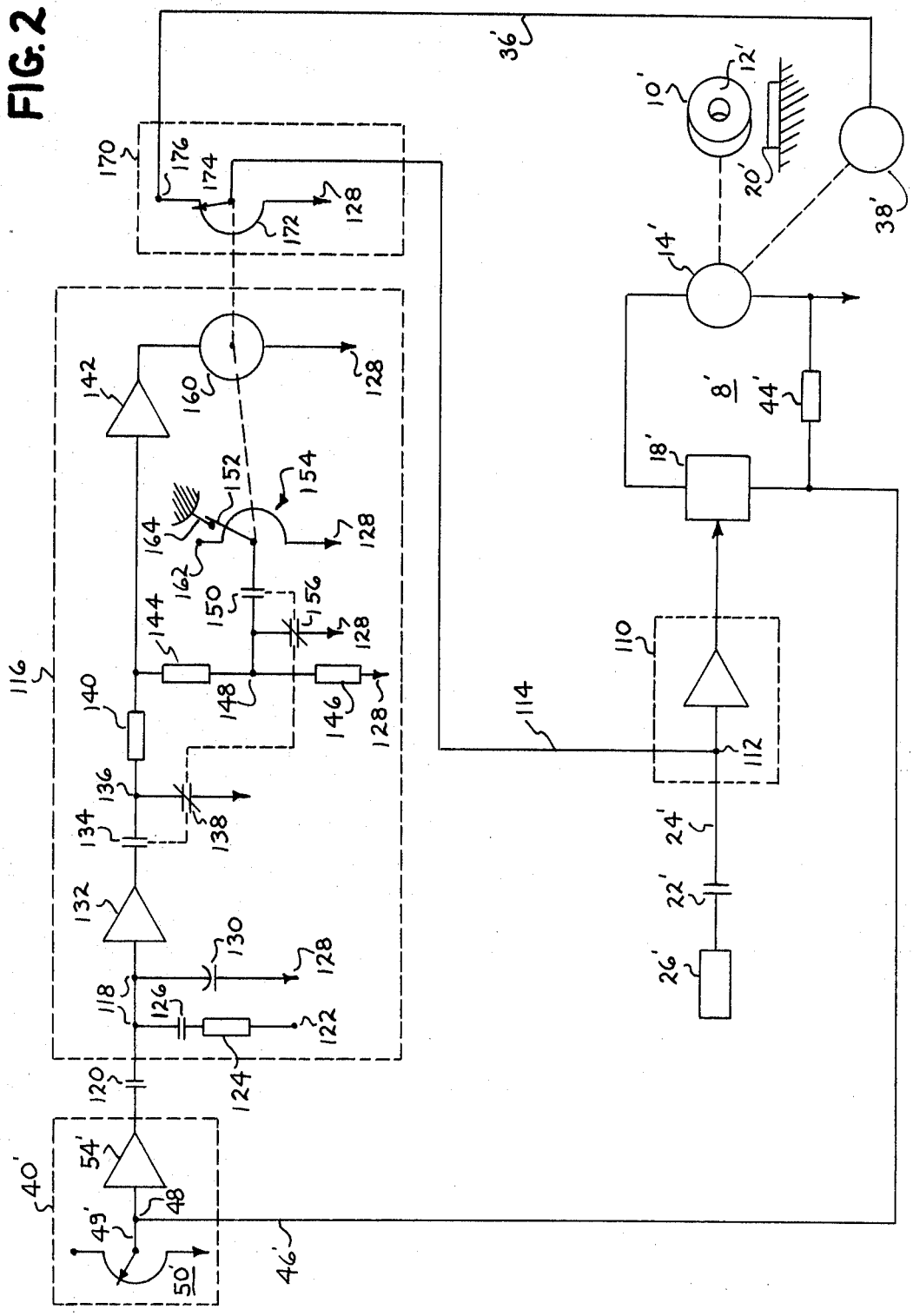
FIG. 2 is a schematic view of an embodiment of this invention in which motor driven primary and auxiliary potentiometers are employed.

Referring now to FIG. 2, a drive system 8' identical in many respects to the drive system 8 of FIG. 1 is illustrated, the drive system 8' including a variable speed motor 14' for driving a grinding wheel 10' about an axis 12'. The motor 14' is supplied with electric power from a power unit 18' controlled by a regulator 110. A command signal 24' of a fixed constant state level (initial fixed ramp) is supplied to an input junction 112 of the regulator 110 when a pair of normally open contacts 22' are closed. The junction 112 is also supplied with a net feedback signal 114 which is substantially equal to the signal 24' in magnitude, but opposite in polarity, when the wheel 10' is operating at a base speed providing a desired peripheral wheel speed. The embodiment of FIG. 2 has an incremental current signal generator 40' identical to the one used in the embodiment of FIG. 1, the generator 40' being supplied with an actual load current signal 46' derived by monitoring the voltage drop across a resistance 44'. From a potentiometer 50' a signal 49' proportional to the drive system no load losses is supplied to junction 48' along with the signal 46', and an incremental current signal is produced by amplifier 54' in response thereto. When the wheel 10' is being accelerated at a fixed rate out of contact with the workpiece 20', the signal produced by the amplifier 54' and supplied to normally open contacts 120 is proportional to the incremental current required to accelerate the wheel at that rate.

Attention is now directed to the block identified in FIG. 2 by the numeral 116, this block comprising apparatus for producing an output proportional to the program speed required for a given peripheral speed. This apparatus includes an input terminal 118 coupled to the amplifier 54' of generator 40' when contacts 120 are closed. Input 118 is coupled to a source 122 of fixed negative voltage through a resistor 124 and a pair of normally open contacts 126, to common 128 through a capacitor 130, and to an amplifier 132. The output of amplifier 132 is coupled through a pair of normally open contacts 134 to a junction 136, which is coupled to common 128 through a pair of normally closed contacts 138. The contacts 134 and 138 are operated in unison such that when one is open, the other is closed, and vice versa. The junction 136 is coupled through a resistor 140 to an amplifier 142. A junction 148 between a pair of resistors 144 and 146 is connected through a normally open switch 150 to the slider arm 152 of a motor driven potentiometer 154. The junction 148 is also connected through the resistor 144 to the amplifier 142 and through the resistor 146 and through a normally closed pair of contacts 156 to common 128. Contacts 150 and 156 are ganged together with contacts 134 and 138 such that contacts 134 and 150 are always in the same conductive condition and contacts 138 and 156 are always in the same conductive condition. The output of amplifier 142 is connected through the d-c drive motor 160 of the motor driven potentiometer 154 to common 128.

The motor driven potentiometer 154 is connected to a source 162 of fixed negative potential selected along with resistors 144, 124 and 140 such that the input signals to amplifier 142 cancel out when (1) contacts 120, 138 and 156 are open, (2) contacts 126, 134 and 150 are closed, and (3) the slider arm 154 of the potentiometer 154 is in the illustrated end position in contact with a limit switch 164. Under these conditions, no further movement of the arm 152 and the armature of the motor 160 will occur since there is no output from the high gain amplifier 142. Furthermore, it will be appreciated that the signal supplied to the amplifier 142 through resistor 140 is fixed by the voltage level of the source 122 and the values of resistors 124 and 140 and the gain of the amplifier 132 (assuming sufficient time for proper charging of the capacitor 130). By adjusting this signal level to equal that produced by the generator 40' when a maximum diameter wheel 10' is accelerated at the fixed rate, it will be seen that the illustrated position of the slider arm 152 and the corresponding position of the armature of the motor 160 can be interpreted to represent the proper program speed for the wheel 10' at the maximum diameter.

Through proper selection of the value of resistor 146 relative to the total resistance of the potentiometer 154, the angular position of the arm 152 and the corresponding position of the armature of the motor 160 can be made directly proportional to $S$, the program speed, in the foregoing relationship $$S = I/(A + BI)$$

where $I$ is not only proportional to the incremental current signal supplied to the amplifier 142 through the resistor 140, but also the balancing signal supplied through resistor 144.

A net feedback signal generator 170 comprises a potentiometer 172 having a slider arm 174 positioned by the motor 160 as a direct function of the position of the slider arm 152 of potentiometer 154. The potentiometer 172 is connected between a terminal 176 and a common 128, the terminal 176 being connected to receive a signal 36' directly proportional to actual motor and wheel speed from tachometer 38'. The slider arm 174 is connected to the junction 112 of regulator 112 to supply the net feedback signal 114 thereto. With the arm 174 in the illustrated end position (corresponding to the end position of arm 152), a net feedback signal 114 equal to the actual speed signal 36' is supplied to the regulator 110. By making the actual speed signal 36' equal in magnitude to the command signal when the actual speed is at a level which provides the desired peripheral speed at the maximum wheel diameter, the drive system will operate at the program speed for a maximum diameter wheel. If, however, the arm 152 is moved clockwise and the arm 174 is moved counterclockwise by a comparable amount, there will be a voltage drop in the potentiometer 172, and a higher actual speed will have to be attained to provide a net feedback signal 114 equal in magnitude to the fixed command signal. By selecting the resistor 146 in the manner described above, the actual speed for various diameters can be varied in accordance with the relationship $S = I/(A + BI)$.

Figure 3:
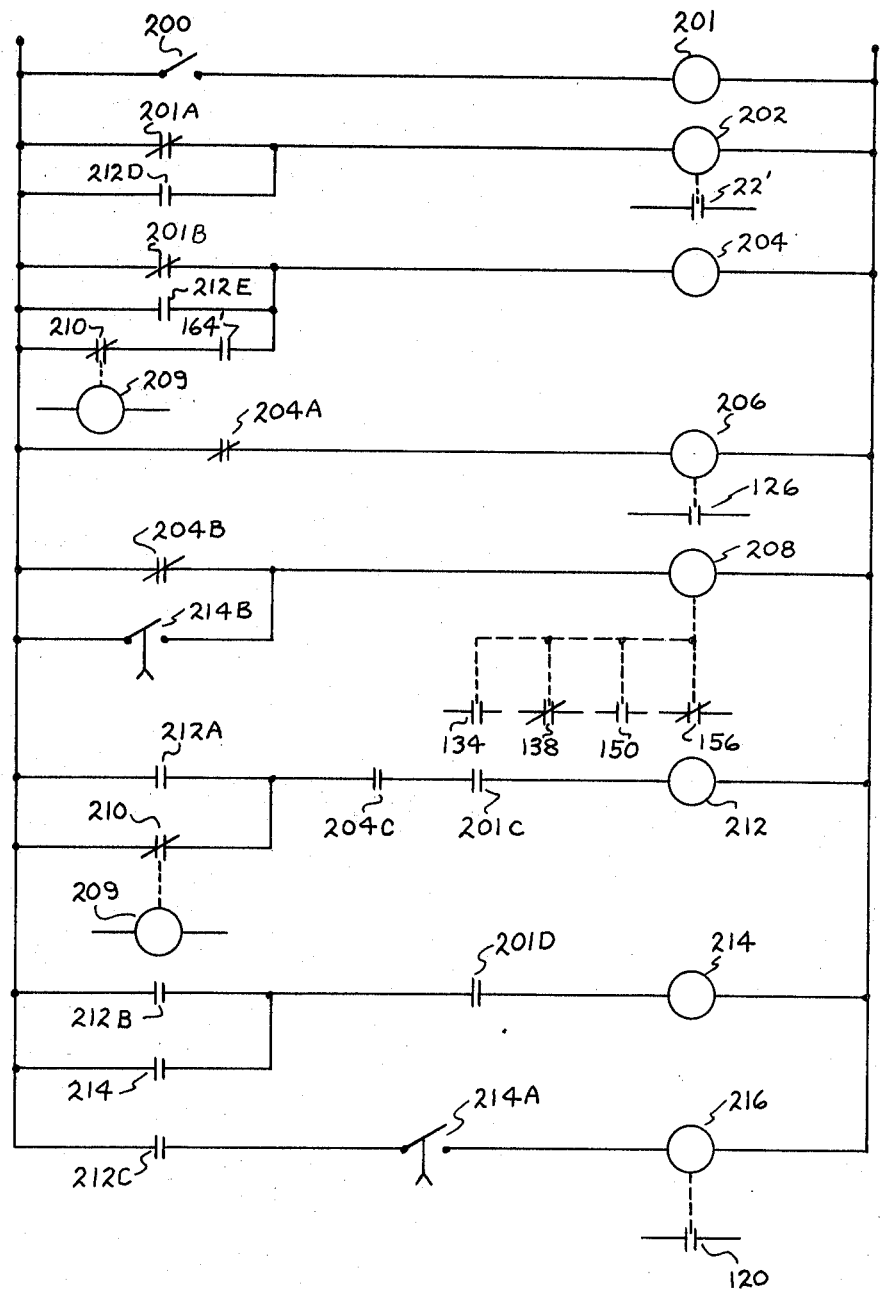
FIG. 3 is a schematic layout of suitable switching circuitry for the embodiment of FIG. 2.

The operation of the apparatus of FIG. 2 will now be described with reference to both FIG. 2 and the contact circuitry of FIG. 3 in which the contacts of FIG. 2 are schematically coupled with their operating coils. All contacts are illustrated in their operative condition when the respective coils are deenergized. In describing the drive system of FIGS. 2 and 3 and its program speed adjusting apparatus, let it be assumed that the wheel 10' is initially being driven at a previously established program speed and has been moved out of contact with the workpiece 20'. At this point, due to possible reduction in wheel diameter during the grinding operation, the peripheral wheel speed may not be sufficiently high for efficient operation. To set a new program speed for the wheel 10' during the period that the wheel is out of contact with the workpiece 20', the operator closes a manual switch 200 to energize a coil 201 and thereby open normally closed contacts 201A and 201B and close contacts 201C and 201D. As a result, coil 202 is deenergized, and this causes contacts 22' to open and thus remove the command signal from the regulator 110. As a result, the wheel 12' will begin to slow down. Coil 204 will also be deenergized due to the opening of contacts 201B, and this will result in the closing of contacts 204A and 204B and the energization of coils 206 and 208. Contacts 204C will also be opened as a result of the deenergization of coil 204. Coil 206 is coupled to contacts 126 such that the contacts 126 close when the coil 206 is energized, and coil 208 is coupled to contacts 134, 138, 150 and 156 such that contacts 134 and 150 close and contacts 138 and 156 open when coil 208 is energized. As a result, during the period in which the motor 14' is slowing down, a signal is supplied through resistors 124 and 140 to the amplifier 142 to drive the potentiometer arm 152 counterclockwise until it reaches its illustrated end position at which, as described above, the signals to the amplifier 142 cancel each other. At this point, the limit switch 164 is tripped, closing the contacts 164' and thereby signalling that the arm 174 of potentiometer 172 is located at its maximum diameter position.

No further charge occurs until the actual voltage of the motor 14' reaches a preselected level at which point a coil 209 is deenergized and contacts 210, which have been open, return to their normally closed position. Since contacts 164' and 210 are now both closed, coil 204 is reenergized and contacts 204A and 204B are opened so as to deenergize coils 206 and 208 and contacts 204C are closed. As a result, contacts 126 and 134 open. Energization of coil 204 also causes contacts 204C to close, and since at this point contacts 210, 201C and 204C are all closed, coil 212 is energized. Energization of coil 212 closes contacts 212A, B, C, D and E. The closing of contacts 212D reenergizes coil 202 and thereby closes contacts 22', reapplying the command signal 24' to the regulator 110. The wheel 10' will therefore begin to accelerate at the predetermined rate. With contacts 212B and 201D both closed at this point, coil 214 is energized. Coil 214 has associated therewith a timing element which deenergizes the coil 216 after a predetermined period less than the normal acceleration period of the wheel 10'. While coil 214 is energized, however, contacts 214A and 214B are closed, and coils 216 and 208 are energized. As a result of the energization of coil 216, contacts 120 are closed to supply the incremental current signal to input junction 118. Since contacts 126 and 134 are both open, the incremental current signal will merely recharge the capacitor 130 to a level proportional to the incremental current signal. While the wheel 10' is still being accelerated, contacts 214A and B open, deenergizing coil 216 and opening contacts 120 and thereby leaving the capacitor 130 in its charged state. Also, since contacts 204B are open at this point, the opening of contacts 214B will deenergize coil 208 and thereby close contacts 134 and 150 and open contacts 138 and 156. As a result, a signal proportional to the charge on the capacitor 130 (also proportional to the incremental current signal) will be supplied through resistor 140 to the high gain amplifier 142. As a result, the armature of the motor 160 and slider arm 152 of potentiometer 154 will move until a new equilibrium position is attained in which the positions of the arms 152 and 174 are proportional to $I/(A + BI)$. The manual switch 200 may then be opened and operation of the grinding wheel 10' can proceed at the new program speed established by the position of the arms 152 and 174. Of course, in practice, it would normally be convenient to replace the manual switch 200 with automatic switching apparatus for automatically initiating the generation of a new program speed after a predetermined period of operation and thereafter automatically deenergizing the coil 201 after a new program speed has been established.

From the foregoing, it will be seen that this invention provides simplified means for indirectly sensing the diameter of a grinding wheel or a similar cylindrical member and adjusting the program operating speed of the drive system to provide a desired peripheral speed within a wide range of wheel diameters.

While the invention has been particularly shown and described with reference to particular solid state end motor driven potentiometer embodiments, it will be understood by those skilled in the art that various changes in form, details, and application may be made without departing from the spirit and scope of the invention. It is therefore intended that all such modifications and changes be included within the scope of the appended claims.

What is claimed as new and is desired to secure by Letters Patent of the United States is:

1. In a drive system including a variable speed drive means for rotatably driving a cylindrical member subject to variations in diameter during drive system operation, speed adjusting control means comprising:

command means for producing a fixed command signal, means for producing an incremental current signal proportional to the incremental current required to accelerate the cylindrical member at a predetermined rate, first means coupled to said incremental current signal generating means and responsive to the incremental current signal to produce a first output proportional to the speed of the drive means required to produce a predetermined peripheral speed of the cylindrical member, second means for producing a second output proportional to the actual speed of the drive means, third means coupled to said first and second means and responsive to the first and second outputs to produce a net feedback signal substantially equal in magnitude to the fixed command signal when the actual speed of the drive means as indicated by the second output is equal to the speed established by the first output, and regulating means coupled to said command means and said third means and responsive to the command signal and the net feedback signal for controlling the speed of the drive means.

2. Speed adjusting control means as defined by claim 1 in which the first output produced by said first means has a magnitude proportional to $I/(A + BI)$ where I is the magnitude of the incremental current, and A and B are constants of proportionality.

3. Speed adjusting control means as defined by claim 2 in which the first and second outputs produced by said first and second means, respectively, are electrical signals.

4. Speed adjusting control means as defined by claim 2 in which said first means comprises an output member movable in response to the incremental current signal, the magnitude of the first output being established by the position of said output member.

5. In a drive system including a variable speed drive means for rotatably driving a cylindrical member subject to variations in diameter during drive system operation, speed adjusting control means comprising:

command means for producing a fixed command signal, means effective during acceleration of the cylindrical member at a predetermined rate for producing an incremental current signal proportional to the incremental current utilized to accelerate the cylindrical member at the predetermined rate and to the diameter of the cylindrical member, first means for producing a first output in response to an input signal and for maintaining the first output upon removal of the input signal, switching means effective during acceleration of the cylindrical member at said predetermined rate to couple said incremental signal generation means and said first means so as to supply the incremental current signal to said first means as an input signal, and said switching means thereafter effective to uncouple said incremental signal generation means, said first means responsive to the incremental current signal such that the first output produced in response thereto has a magnitude proportional to the speed of the drive means required to produce a predetermined peripheral speed of the cylindrical member at the diameter indicated by the incremental current signal, second means for producing a second output proportional to the actual speed of the drive means, third means coupled to said first and second means and responsive to the first and second outputs to produce a net feedback signal substantially equal in magnitude to the fixed command signal when the actual speed of the drive means as indicated by the second output is equal to the speed established by the first output, and regulating means coupled to said command means and said third means and responsive to the command signal and the net feedback signal for controlling the speed of the drive means.

6. Speed adjusting control means as defined by claim 5 in which the first output produced by said first means has a magnitude proportional to $I/(A + BI)$ where $I$ is the magnitude of the incremental current, and $A$ and $B$ are constants of proportionality.

7. Speed adjusting control means as defined by claim 6 in which the first and second outputs produced by said first and second means, respectively, are electrical signals.

8. Speed adjusting control means as defined by claim 7 in which first means further comprises energy storage means for maintaining a charge proportional to the incremental current signal, means for receiving fixed signals proportional to the constants of proportionality $A$ and $B$, and static network means responsive to the charge of said energy storage means and the signals proportional to the constants $A$ and $B$ to produce the first output.

9. Speed adjusting control means as defined by claim 8 in which said static network means comprises a solid state multiplier having a first input coupled to said energy storage means and a second input connected to receive the fixed signal proportional to the constant $B$ for producing an output proportional to $BI$, summing means coupled to the output of said solid state multiplier and to receive the fixed signal proportional to $A$ for producing an output proportional to $A + BI$, and a solid state divider having a dividend input coupled to said energy storage means and a divisor input coupled to the output of said summing means for producing the first output.

10. Speed adjusting control means as defined by claim 6 in which said first means comprises an output member movable in response to the incremental current signal, the magnitude of the first output being established by the position of said output member.

11. Speed adjusting control means as defined by claim 10 in which the second output produced by said second means is an electrical voltage and in which:

said first means further comprises a motor driven potentiometer and a resistive network coupled between said switching means and the slider arm of said potentiometer, said resistive network being selected such that the position of the slider arm is established in accordance with the aforesaid relationship $I/(A + BI)$, and in which said third means comprises an auxiliary potentiometer having a slider arm coupled to and positioned in unison with the slider arm of said motor driven potentiometer, said auxiliary potentiometer being coupled between said second means for receiving the second output therefrom and a source of fixed voltage and the slider arm of said auxiliary potentiometer being coupled to said regulating means for supplying the feedback signal thereto.

12. A method of adjusting the operating speed of a drive system for driving a member such as a grinding wheel or the like subject to gradual reduction of diameter during prolonged operation, said method comprising:

periodically accelerating the drive system and its driven member at a predetermined rate and measuring the incremental current required to accelerate the driven member, utilizing the measured incremental current to establish a program speed required to drive the driven member at a predetermined peripheral speed, and utilizing the established program speed and the actual drive system speed to maintain operation at the program speed.

* * * * *